June 30, 1953 — E. P. BULLARD III — 2,643,571
MACHINE TOOL CENTERING DEVICE
Filed May 15, 1948 — 2 Sheets-Sheet 2
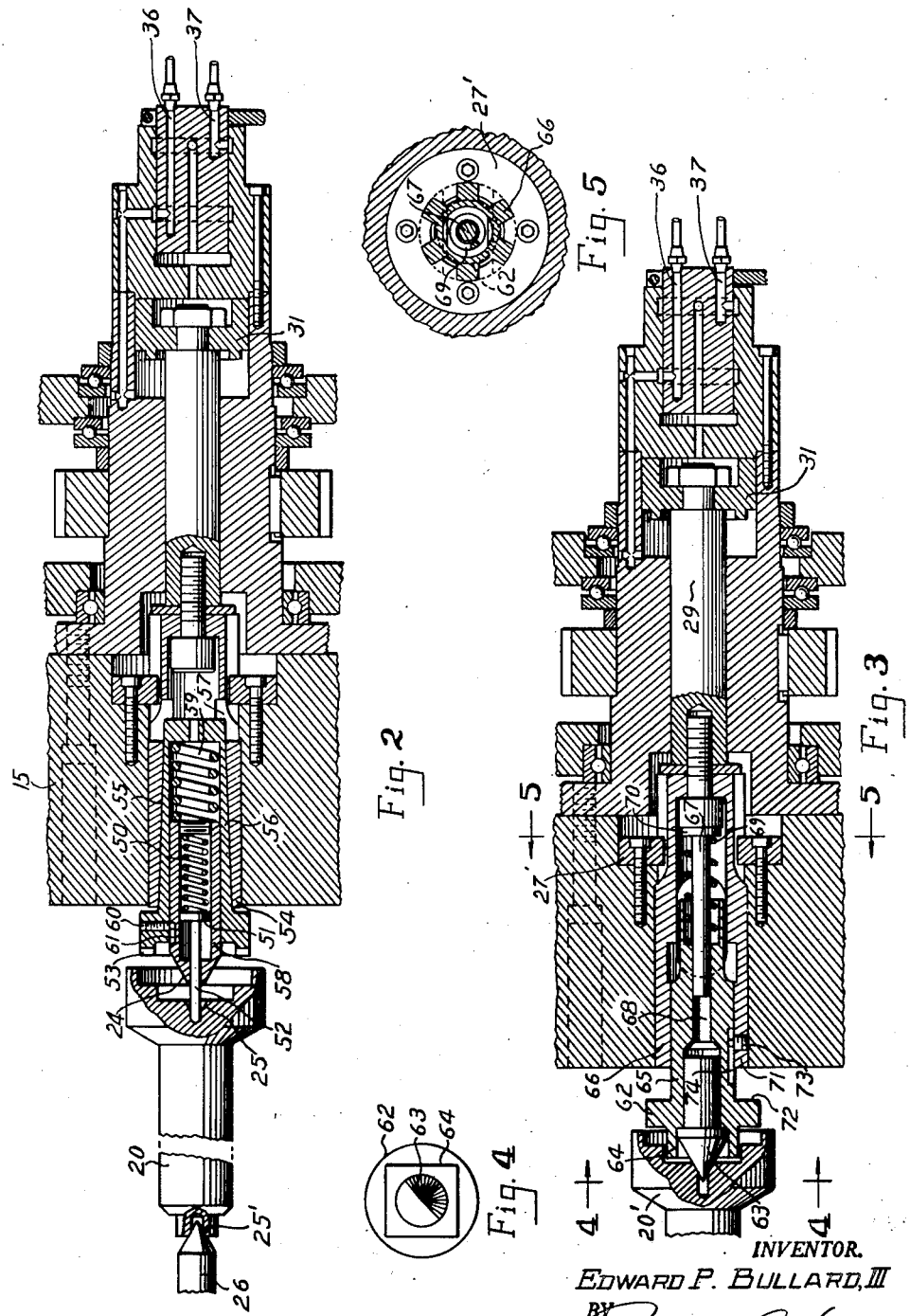
INVENTOR.
EDWARD P. BULLARD, III
BY
ATTORNEY Patented June 30, 1953

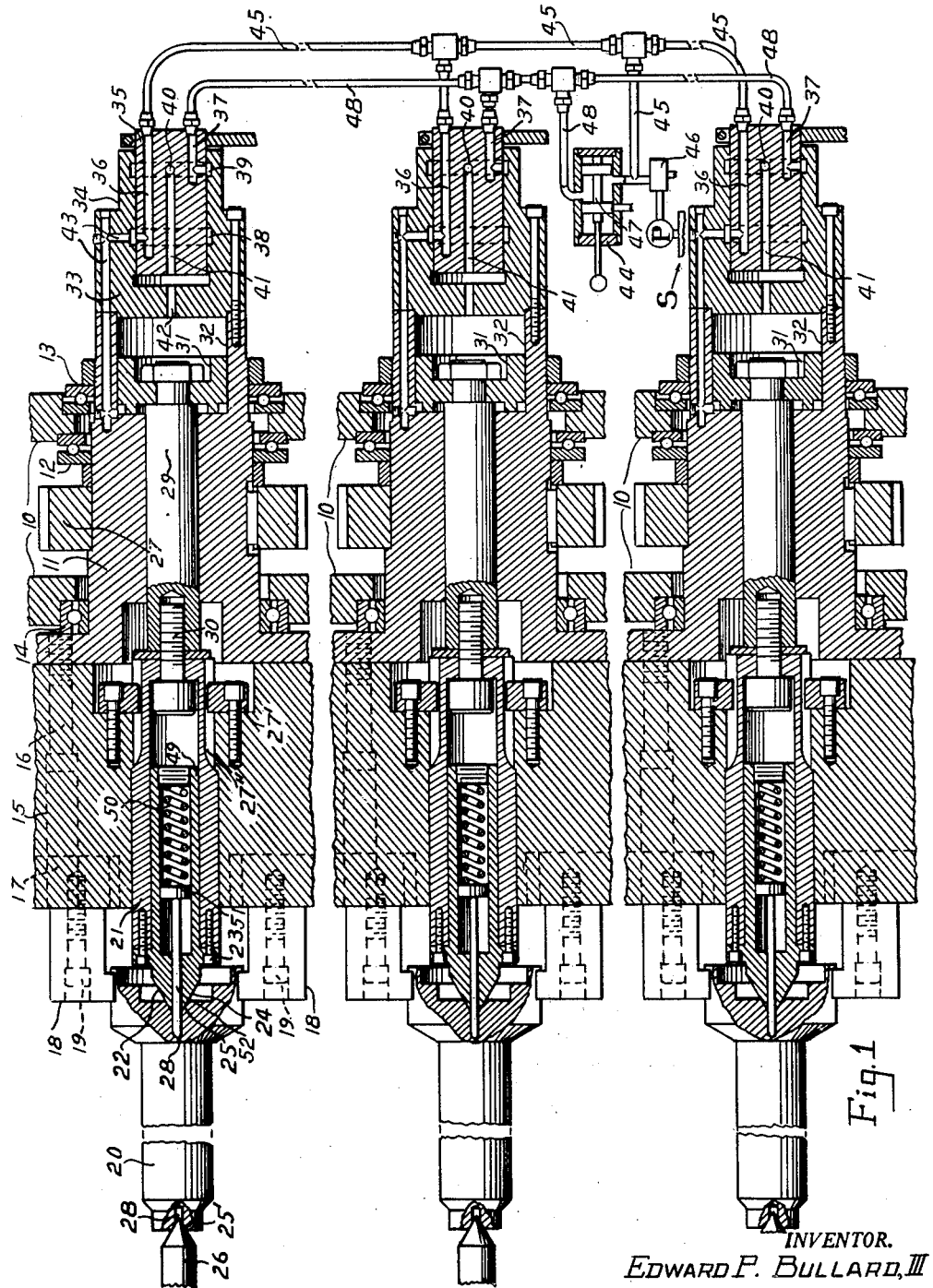

2,643,571

UNITED STATES PATENT OFFICE 2,643,571

MACHINE TOOL CENTERING DEVICE

Edward P. Bullard III, Fairfield, Conn., assignor to The Bullard Company, a corporation of Connecticut Application May 15, 1948, Serial No. 27,185

5 Claims. (Cl. 82—33)

This invention relates to the art of machining metals, and particularly to loading work into machine tools such that it is firmly held during a working operation.

Present day machining of metal, particularly in the turning field, usually requires the manual loading of work into power-operated chucking and centering devices. To better understand the principles of the present invention, it is believed necessary to clarify certain definitions relating to the word "center." For the purposes of this invention the expression "work center" shall mean the construction at the ends of work pieces, along the axis about which the work is to be rotated during a machining operation. The expression "work-supporting center" shall mean the element of a machine tool that co-operates with the "work center" of the work to center the work preparatory to a machining operation.

Prior-known methods of loading work in a lathe required placing one work center on one of the work-supporting centers and moving the other work-supporting center into cooperation with the remaining work center. Not too much difficulty was experienced with this method in manually-movable work-supporting centers, however, with the advent of power chucking, involving power-operated work-supporting centers, considerable difficulty was experienced. As is well understood, the work centers are necessarily accurately formed, and unless exact registry of work and work-supporting centers occurs damage to the work center is occasioned. Furthermore, in order to prevent this damage occurring, the operator frequently subjected his hands to injury by catching them between the work and work-supporting center.

Multiple-spindle lathes employing simultaneously-operable power-chucking mechanisms present a special problem of loading and unloading work between their work-supporting centers. While it might be possible to simultaneously power chuck two pieces of work by the old method above-described, with its attending disadvantages, certainly the simultaneous power-chucking of lathes having more than two spindles presents an insurmountable problem if the old method of chucking were employed.

The principal object of this invention is to overcome the difficulties encountered with prior known methods of centering work in a lathe or the like. Other objects include the provision of a device that will substantially accurately radially locate the work prior to engagement of one of the work-supporting centers with one of the work centers; the provision of a work-supporting center that will permit preloading of the work in the machine tool prior to power centering and power chucking of the work; the provision of apparatus that will permit an operator to preload a plurality of spindles prior to the simultaneous power centering and chucking of the plurality of work pieces; the provision of apparatus in which a resiliently mounted pin is adapted to cooperate with one of the work-supporting centers to locate the work radially relatively to both work-supporting centers but independently of one; and the provision of a work-supporting center having a spring-pressed auxiliary work-supporting center that can be manually depressed by an operator for loading a work piece between the auxiliary center and another work-supporting center independently of the work-supporting center having the auxiliary center.

The above, as well as other objects and novel features of the improved work-supporting center, will become evident from a consideration of the following specification and accompanying drawings, in which:

Figure 1 is a sectional elevational view of a plurality of spindles in a multiple-spindle lathe to which the principles of the invention have been applied, and with the work being shown in centered and chucked position;

Fig. 2 is a view of a single spindle to which a modification of the apparatus of Fig. 1 has been applied;

Fig. 3 is a view of a single spindle to which a still further modification of the apparatus of Fig. 1 has been applied;

Fig. 4 is a section along line 4—4 of Fig. 3; and

Fig. 5 is a section along line 5—5 of Fig. 3.

Referring to the drawings, and particularly to Fig. 1, the principles of the invention are shown as applied to a three spindle horizontal lathe. Since the spindles are identical, only one will be described specifically. A frame member 10 rotatably supports a spindle 11 through anti-friction bearings 12, 13 and 14. A chuck body 15 is fastened to spindle 11 by screws 16, and it includes sliding jaws 17 that are shown as radially movable relatively to body 15, although they could with equal facility be of the retractable type. Top jaws 18 are attached to the sliding jaws by screws 19, and upon radial movement of the sliding jaws 17, the work 20 is clamped or unclamped.

The body 15 includes a tubular sleeve 21, to the one end of which is fixed a work-supporting center 22 by screws 23. The work-supporting center 22 includes the usual conical portion 24 that cooperates with the usual mating portion of the work center 25 to support the work 20 between the work-supporting centers 22 and 26. This latter work-supporting center is commonly referred to as the dead center since rotative power is not transmitted throught it to the work, but through the chuck body 15 that supports the so-called live work-supporting center 22. Rotation of chuck body 15 is effected by the rotation of a gear 27 keyed to spindle 11 and driven by a headstock transmission that is not shown. An internally splined ring 27' fastened to the chuck body 15 drivingly mates with a spline 27" formed on the sleeve 21 to effect rotation of the latter with chuck body 15 and still permit relatively axial movement between the two.

The work piece 20 is generally cylindrical and is provided with work centers 25, 25' located along its longitudinal axis about which it is to be rotated. The centers 25, 25' are usually formed by a center drill which is a special tool having an end that exactly conforms to the centers 25, 25'. It includes a cylindrical drill portion of relatively small diameter that enters the work initially and forms the cylindrical passage 28; and a conical cutter that forms the conical portion that mates with the conical portion 24 of the work-supporting center 22.

In order to load the work 20 between the work-supporting centers 26 and 22, it is evident that the initial spacing between them must be more than the greatest longitudinal diagonal of the work 20. Since the work-supporting center 26 is stationary, work-supporting center 22 must be capable of axial movement from a loading position to a work-centering position. Accordingly, the sleeve 21 is fixed to a piston rod 29 by a screw 30. The rod 29 extends through an axial hole within the spindle 11 and has a piston 31 fixed to its one end that is adapted to be reciprocated within a cylinder 32 formed in the end of spindle 11. The one end of cylinder 32 is closed by a plate 33 having a hollow boss 34, which latter forms a bearing for a supporting trunnion 35 that is rigidly and stationarily supported by the frame of the lathe.

The trunnion 35 includes two passages 36, 37 that respectively communicate with distributing grooves 38, 39 formed in the inner peripheral surface of the boss 34. A radial passage 40 opens into groove 39 and connects with an axial passage 41 which in turn communicates with an axial passage 42 in plate 33. Passage 42 opens into cylinder 32 on one side of piston 31. A passage 43 in the boss 34 communicates with the groove 38 and the cylinder 32 on the opposite side of piston 31 from that which is exposed to passage 42. Selective introduction and exhaust of fluid to passages 36 and 37 will cause reciprocation of piston 31 and consequently movement of work-supporting center 22 from a loading position to a work-centering position.

In the embodiment disclosed, three horizontal spindles of identical construction are shown, and each is provided with a reciprocable work-supporting center that is adapted simultaneously to be operated with the others. Simultaneous operation of the plurality of movable, work-supporting centers is effected by manually operating a valve 44 that is supplied with fluid under pressure from a source of supply S by a pump P. The fluid system includes a common pipe line 45 that is connected to the passages 36 of all spindles and which is connected to the pump P between the valve 44 and a relief valve 46. Accordingly, fluid under pressure is continuously supplied to the left hand face of each piston 31 urging it rightwardly and consequently the work supporting centers 22 to their loading or open positions.

The valve 44 includes a spool 47, which when in the position shown in Fig. 1, causes the fluid to pass through a line 48 to the passages 37, thence to the passages 41 and to the cylinders 32 where it acts on the right hand face of pistons 31. Since the area of the right side of pistons 31 is greater than that of the left hand side, the work-supporting centers 22 are moved to their work-centering positions as shown. Movement of spool 47 leftwardly (Fig. 1) causes the exhaust of line 48, hence the rightward movement of the pistons 31 and the movement of the work-supporting centers 22 to their loading or open positions.

The mechanism described thus far is somewhat conventional, with possibly the exception of the simultaneous operation of the plurality of work-supporting centers 22, which it can be appreciated would be difficult of accomplishment to simultaneously chuck a plurality of work pieces, since it would require the supporting of three work pieces simultaneously in axial alignment with the three sets of work-supporting centers. Even if only one work-supporting spindle 22 were power operated as described, great inconvenience would be experienced in locating the work between the work-supporting centers 26 and 22 because of the difficulty to maintain axial alignment between the work centers and the work-supporting centers as one of the latter is moved under power into centering position.

In the present invention one of the work-supporting centers of each set is provided with an auxiliary work-supporting center that cooperates with the other work-supporting center of each set to locate the work properly relatively to both work-supporting centers, but independently of one of the work-supporting centers. The work-supporting center 22 includes a tubular portion 49 that telescopes within the tubular sleeve 21. A spring 50 and a piston 51 are located within tubular portion 49, and a straight pin 52 is slidingly mounted within a passage along the axial centerline of the work-supporting center 22. The one end of pin 52 abuts piston 51 and the other end extends substantially beyond the apex of the conical portion 24 of the work-supporting center 22.

With the parts in the position shown in Fig. 1 the work 20 is clamped in centered position in condition to have a turning operation performed upon it. With the jaws 18 in unclamped position, movement of spool 47 of valve 44 leftwardly would cause sleeve 21 to move rightwardly, retracting conical portion 24 from the mating portion of the work center 25. However, pin 52 will remain seated at the bottom of cylindrical portion 28 since spring 50 will expand as sleeve 21 moves rightwardly, somewhat in the manner shown in Fig. 2. Accordingly, pin 52 cooperates with work-supporting center 26 and the work centers 25, 25', to maintain all centers in substantial axial alignment. To remove the work from the lathe, the operator need only grasp the work and move it rightwardly thereby compressing spring 50 until the work center 25' clears the work-supporting center 26 whereupon the work 20 can be pivoted outwardly away from the work-supporting center 26 and easily removed from the lathe. The reverse of the above process is employed to load the work piece 20 between the work-supporting centers 22 and 26, i. e. by first locating work center 25 on pin 52 and forcing it rightwardly until the work center 25' at the other end of the work 20 passes into axial alignment with work-supporting center 26. Release of the rightward force compressing spring 50 will cause it to expand thereby causing cooperation between pin 52 and work-supporting center 26 to support the work in substantially centered position independently of the conical portion 24 of the work-supporting center 22. Movement of spool 47 to the position shown in Fig. 1 will cause work-supporting center 22 to move into centering position relatively to the work 20.

A modification of the invention is disclosed in Fig. 2 wherein the chuck jaws are dispensed with, and a serrated driving head 53 is provided. In this embodiment, a sleeve 54 is mounted for axial movement within the chuck body 15 and includes a tapered portion 55 adapted to receive a mating tapered shank 56 of the driving head 53. The sleeve 54 is provided with a slot 57 for facilitating removal of the head 53, and also with a splined driving construction similar to that of sleeve 21 of Fig. 1.

A work-supporting center 58 is mounted for slight axial movement within the head 53 and is backed up by a spring 59 of sufficient strength adequately to maintain the work-supporting center 58 in proper radial position relatively to the work center 25 while a machining operation is being performed upon the work 20. In order to maintain spring 59 pre-loaded and to prevent work-supporting center 58 from being discharged from the head 53 when said center is not in engagement with the work, a set screw 60 is located in head 53 and extends into a slot 61 in center 58.

The work-supporting center 58 includes a straight pin 52, a piston 51 and a spring 50, for the same reason that work-supporting center 22 includes such elements. With the parts in position as shown in Fig. 2, work 20 can be removed by simply forcing it rightwardly thereby compressing spring 50 until the left hand end of the work clears the work-supporting center 26. Loading of the work requires placing work center 25 on pin 52 and forcing it rightwardly until the left hand end of the work 20 can pass into cooperative alignment with work-supporting center 26, whereupon release of the force required to compress spring 50 causes pin 52 and work-supporting center 26 to center the work independently of the conical forward end of work-supporting center 58.

With the parts in position shown in Fig. 2, the introduction of fluid under pressure into line 37 causes piston 31 to move leftwardly, thereby moving work-supporting center 58 into centering position with the work 20. After the center 58 stops, further movement of piston 31 leftwardly forces head 53 into driving relation with the work 20 with the attending compression of spring 59.

Fig. 3 is a different embodiment of the invention. In this species, the driving head 62 and the work-supporting center 63 are integral. The head 62 is provided with a square-end driving portion 64 that mates with a square hole in the end of the work 20'. The shank 65 of the head 62 is slidably mounted within a sleeve 66. The sleeve 66 is connected to the piston rod 29 in the same manner that sleeve 21 is connected to the rod 29 in Fig. 1. A tail rod 67 of the piston rod 29 slidingly fits within an axial bore 68 of the shank 65, and a spring 69, of a compressive force easily overcome by an operator, surrounds rod 67 between the end of head 62 and a collar 70 integral with the rod 67.

With the parts in the position shown in Fig. 3, the work 20' may be forced rightwardly by the operator, compressing spring 69 so that the work may be easily loaded and unloaded from the lathe. With a work piece 20' in the position shown in Fig. 3, admission of fluid under pressure to line 37 will move piston 31 leftwardly and with it, sleeve 66 until its ends 71 abuts a surface 72 of the head 62 thereby holding the head 62 in driving relation with the work 20'. A pin 73 is screwed into sleeve 66 and includes a finger that rides within a slot 74 within the head 62 in order to limit the outward movement of head 62 due to the pre-loading of spring 69.

Although the various features of the new and improved centering apparatus have been shown and described in detail to fully disclose three embodiments of the invention, it will be evident that numerous changes may be made in such details and certain features may be used without others, without departing from the principles of the invention.

What is claimed is:

1. In combination, a work-supporting center having a tapered nose adapted to seat within a work center; a straight pin mounted for axial movement within said work-supporting center, and of such length that its free end is adapted to extend substantially beyond the nose of said work-supporting center to radially locate the work relatively to, but independently of said work-supporting center; and a spring adapted to urge the free end of said pin outwardly of said work-supporting center by a force that can be overcome by an operator in loading work on said pin.

2. In a machine tool, a work-supporting center comprising in combination, a support; means for moving said support; a conical head attached to said support and adapted to mate with a work center; a straight pin slidingly mounted within said head along its longitudinal axis and extending outwardly therefrom through the apex of the conical head; a piston within an axial bore of said support adapted to abut the one end of said pin; and a spring within said support for urging said piston in a direction to move the free end of said pin outwardly from said head substantially beyond the apex of the conical head.

3. In a machine tool, a work-supporting center mechanism comprising in combination, a support; means for moving said support; a work gripping head mounted within said support for movement therewith; a conical-headed member slidingly mounted within said gripping head; a pre-loaded compression spring between said work gripping head and said conical headed member, said spring being of sufficient strength adequately to maintain a work piece in fixed radial position relatively to said conical headed member during a working operation on said work; a straight pin slidingly mounted within said conical headed member and extending outwardly a substantial distance beyond the apex of said conical headed member; and a spring means for urging said pin outwardly through said conical headed member, said last-mentioned spring being of a strength inadequately to maintain said work piece in fixed radial position relatively to said conical-headed member during a machining operation thereon, and capable of being readily compressed by an operator.

4. In a machine tool, a plurality of spindles; a support within each of said spindles; fluid-operated means for simultaneously moving all of said supports; a conical head attached to each of said supports and each adapted to mate with the center formed in a work piece for each spindle; a straight pin slidingly mounted within each said head along its longitudinal axis and extending outwardly therefrom through the apex of its conical head; a piston within an axial bore of each of said supports adapted to abut the one end of the pin in its respective conical head; a spring within each of said supports for urging the pin within its conical head outwardly therefrom substantially beyond the apex of its respective conical head; and valve means for simultaneously rendering all of said fluid-operated means effective.

5. In a machine tool, a plurality of spindles; a support within each of said spindles; fluid-operated means for simultaneously moving all of said supports; a work-gripping head mounted within each of said supports for movement therewith; a conical-headed member slidingly mounted within each of said driving heads; a pre-loaded compression spring between each of said work-gripping heads and its corresponding conical-headed member, said spring being of sufficient strength adequately to maintain a work piece in fixed radial position relatively to the conical-head member of each support during a working operation on said work; a pin slidingly mounted within each of said conical-headed members and extending outwardly a substantial distance beyond their respective apexes; resilient means for urging each of said pins outwardly through its corresponding conical-headed member, said last-mentioned springs being of a strength inadequately to maintain the respective work pieces in fixed radial position relatively to their conical-headed members during a machining operation thereon, and capable of being readily compressed by an operator; and valve means for simultaneously rendering effective all of said fluid-operated means.

EDWARD P. BULLARD III.

References Cited in the file of this patent

UNITED STATES PATENTS

| Number | Name | Date |
|---|---|---|
| 379,307 | Codling | Mar. 13, 1888 |
| 868,448 | Keil | Oct. 15, 1907 |
| 1,748,672 | Groene | Feb. 25, 1930 |
| 2,033,449 | Romaine et al. | Mar. 10, 1936 |
| 2,430,997 | Schmidt, Jr. | Nov. 18, 1947 |

FOREIGN PATENTS

| Number | Country | Date |
|---|---|---|
| 703,550 | Germany | Feb. 6, 1941 |